(12) United States Patent
Gu et al.

(10) Patent No.: US 9,278,606 B2
(45) Date of Patent: Mar. 8, 2016

(54) HEATER FOR VEHICLES

(71) Applicant: HALLA CLIMATE CONTROL CORP., Daejeon (KR)

(72) Inventors: Jung Sam Gu, Daejeon (KR); Kwang Hun Oh, Daejeon (KR); Jun Young Song, Daejeon (KR); Hong-Young Lim, Daejeon (KR); Young-Ha Jeon, Daejeon (KR)

(73) Assignee: HALLA CLIMATE CONTROL CORP., Daejeon (KR)

( * ) Notice: Subject to any disclaimer, the term of this patent is extended or adjusted under 35 U.S.C. 154(b) by 383 days.

(21) Appl. No.: 13/895,869

(22) Filed: May 16, 2013

(65) Prior Publication Data

US 2013/0306622 A1 Nov. 21, 2013

(30) Foreign Application Priority Data

May 16, 2012 (KR) .................. 10-2012-0051789
Apr. 24, 2013 (KR) .................. 10-2013-0045179

(51) Int. Cl.
| | |
|---|---|
| *F24H 3/10* | (2006.01) |
| *H05B 3/24* | (2006.01) |
| *B60H 1/22* | (2006.01) |
| *F24H 3/06* | (2006.01) |
| *F24H 3/04* | (2006.01) |

(52) U.S. Cl.
CPC ............ *B60H 1/2225* (2013.01); *F24H 3/0429* (2013.01); *F24H 3/062* (2013.01); *H05B 3/24* (2013.01); *F24H 3/0458* (2013.01); *H05B 2203/02* (2013.01); *H05B 2203/023* (2013.01)

(58) Field of Classification Search
None
See application file for complete search history.

(56) References Cited

U.S. PATENT DOCUMENTS

| | | | |
|---|---|---|---|
| 7,971,799 B2 | 7/2011 | Colette et al. | |
| 2004/0252986 A1* | 12/2004 | Ito et al. | ......................... 392/485 |
| 2006/0013574 A1* | 1/2006 | Ito et al. | ......................... 392/485 |
| 2010/0282729 A1* | 11/2010 | Taguchi | ......................... 219/202 |
| 2011/0127247 A1* | 6/2011 | Choi et al. | ..................... 219/202 |
| 2014/0008450 A1* | 1/2014 | Gu et al. | .................. 237/12.3 R |
| 2015/0043898 A1* | 2/2015 | Gu et al. | ........................ 392/360 |
| 2015/0300686 A1* | 10/2015 | Pierron | ................. F24H 3/0458 392/347 |

FOREIGN PATENT DOCUMENTS

| | | |
|---|---|---|
| EP | 1370117 A2 * 12/2003 | ............... H05B 3/14 |
| JP | 05-095625 U | 12/1993 |
| JP | 1996-091041 A | 4/1996 |
| JP | 2005-329812 A | 12/2005 |
| JP | 2007-278609 A | 10/2007 |
| JP | 2009-255739 A | 11/2009 |
| JP | 2010-125997 A | 6/2010 |
| KR | 10-2005-0034997 A | 4/2005 |
| KR | 10-2011-0060274 A | 6/2011 |
| WO | WO 2014119902 A1 * 8/2014 | |

* cited by examiner

*Primary Examiner* — Joseph M Pelham
(74) *Attorney, Agent, or Firm* — Novick, Kim & Lee, PLLC; Jae Youn Kim

(57) ABSTRACT

Provided is a heater for vehicles, and more particularly, a heater for vehicles which can be easily manufactured and have a reduced thickness to implement miniaturization, by forming a heat radiating part using a plate-shaped first support part (and second support part) vertically disposed to the flow direction of air, and can fix the support part and the heat radiating part by a simple method to increase manufacturability.

20 Claims, 16 Drawing Sheets

HEATER FOR VEHICLES

CROSS-REFERENCE TO RELATED APPLICATIONS

This application claims priority under 35 U.S.C. §119 to Korean Patent Application No. 10-2012-0051789, filed on May 16, 2012 and 10-2013-0045179 filed on Apr. 24, 2013 in the Korean Intellectual Property Office, the disclosure of which is incorporated herein by reference in its entirety.

TECHNICAL FIELD

The following disclosure relates to a heater for vehicles, and more particularly, to a heater for vehicles which can be easily manufactured and have a reduced thickness to implement miniaturization, by forming a heat radiating part using a plate-shaped first support part (and second support part) vertically disposed, i.e., perpendicularly oriented with respect to the flow direction of air, and can fix the support part and the heat radiating part by a simple method to increase manufacturability.

BACKGROUND

A heating device used to increase an external temperature uses various methods and is used for various purposes.

In particular, among heating devices disposed in an engine room in a vehicle, a heating device that takes charge of interior heating is configured to heat the inside of a vehicle by circulating a heat exchange medium for lowering an engine temperature around a heater core to heat external air.

However, among engines, a diesel engine has a high heat exchange rate and thus requires much time to heat the heat exchange medium cooling an engine at the time of starting the diesel engine, as compared with a gasoline engine.

Therefore, a vehicle with a diesel engine delays heating of the heat exchange medium after the initial starting during the winter season, such that the initial interior heating performance may be degraded.

In order to solve the above-mentioned problems, an air heating heater for vehicles that directly heats air ventilated to the interior side by using various devices has been proposed.

Next, the air heating heater may further improve a heating performance by directly heating air, but occupy a space corresponding to a size of a heater under conditions in which it is difficult to secure a sufficient space in the engine room with the tendency of miniaturization and high efficiency, which may be a cause of hindering the miniaturization.

In particular, a cartridge heater using a Nichrome wire has a difficulty in controlling temperature, may be overheated when air is not ventilated to the heater side and may have an insulating problem and the risk of fire due to high voltage.

Further, an air conditioner for a vehicle using a positive temperature coefficient (PTC) heater is disclosed in Japanese Patent Application Publication No. 2009-255739 and the PTC heater according to the related art is illustrated in FIG. 1.

In FIG. 1, the flow direction of air is represented by an arrow and the PTC heater illustrated in FIG. 1 includes a heat source part 11 comprised of a PTC element, a heat radiating part 12 contacting the heat source part 11 and efficiently discharging heat, and a housing 20 enclosing and protecting a terminal part, the heat source part 11, and the heat radiating part 12.

The PTC heater according to the related art may have a slight difference in terms of the detailed configuration, but the heat source part is formed in parallel with the flow direction of air, such that the formation area of the heat source part directly affects the heat radiating performance, thereby having a limitation in reducing a thickness (in the flow direction of air) of the PTC.

In particular, in the case of the PTC heater, an electrical problem may occur when a heat radiating condition is poor. Therefore, the PTC heater needs to include a heat radiating part (generally, a heat radiating fin), such that a manufacturing and assembling process of the heat radiating part may be troublesome and the durability of the entire PTC heater may be degraded when heat is not effectively radiated.

Therefore, a need exists for the development of a heater which can increase the heat exchange efficiency to further improve the heating performance, be miniaturized and easily controlled, prevent the problems that may occur due to the overheating, and further improve the safety, by directly heating air while smoothing the flow of air.

RELATED ART DOCUMENT

Patent Document

Patent 1) Japanese Patent Application Publication No. 2009-255739 (Title of Invention: Air conditioner for vehicle, Publication Date: Nov. 5, 2009)

SUMMARY

An embodiment of the present invention is directed to providing a heater for vehicles which can be easily manufactured and have a reduced thickness to implement miniaturization, by forming a heat radiating part using a plate-shaped first support part and a second support part, both of which being perpendicularly oriented with respect to the flow direction of air, and can fix the support part and the heat radiating part by a simple method to increase manufacturability.

In one general aspect, there is provided a heater for vehicles, including: a first support part 100 that has a plate shape perpendicularly oriented with respect to a flow direction of air and includes a first heat radiating region A110 and a first air flow region A120 provided with a plurality of perforated holes disposed at predetermined locations; a heat radiating part 200 that is formed in the first heat radiating region A110 of the first support part 100 to discharge heat; and a housing 400 that supports and fixes the first support part 100 and an end of the heat radiating part 200, wherein the first support part 100 is further provided with a first fixation part 501 for fixing one side of the heat radiating part 200.

The heat radiating part 200 may include a heat radiating tube 221 that includes a positive temperature coefficient (PTC) element.

The first fixation part 501 may be a pair of protruding guides 510 that supports both ends of the heat radiating tube 221 on one side of the first support part 100 and protrudes to have a separation distance therebetween to be narrowed as they extend outwardly, and a predetermined region of the heat radiating tube 221 may have a shape corresponding to a region defined between the protruding guides 510.

The heater for vehicles may further include: a protruding part 212 protruding outwardly from the heat radiating tube 221 and penetrating through the first support part 100, wherein the first fixation part 501 is a fixed groove 520 into which the protruding part 212 of the heat radiating tube 221 is inserted.

The heat radiating tube 221 may be fixed to the first support part 100 by caulking or folding a portion of the protruding part, the portion protruding from the first support part 100 by penetrating through the fixed groove 520.

The heater for vehicles may further include: a protruding part 212 protruding outwardly from the heat radiating tube 221 and penetrating through the first support part 100, wherein the first fixation part 501 is at least one of the perforated holes of the first support part 100 and the protruding part of the heat radiating tube 221 is fixed to the first support part 100 by caulking or folding a portion of the protruding part, the portion protruding from the first support part 100 by penetrating through the at least one of the perforated holes.

The heat radiating tube 221 may be provided with an extension 211 of which both sides extend in a height direction, and wherein one side of the extension is in contact with the first heat radiating region A110 and the extension 211 may be provided with the protruding part 212.

The heat radiating part 200 may include: a heat radiating tube 221; a guide plate 222 that is disposed in the heat radiating tube 221 and is provided with a plurality of through holes disposed in a width direction; wherein the PTC element 223 is disposed in a through hole of the plurality of through holes of the guide plate 222; and an anode plate 224 and a cathode plate 225 that are disposed at both sides of the guide plate 222 in the heat radiating tube 221, respectively.

The first support part 100 and the heat radiating tube 221 may be fixed in the state in which one side or both sides of the first heat radiating region A110 and the heat radiating tube 221 of the first support part 100 are applied with a heat conductive layer 600.

The heater for vehicles may further include: a first louver fin 102 that is extendedly formed at an edge of one of the plurality of perforated holes.

In another general aspect, there is provided a heater for vehicles, including: a first support part 100 that has a plate shape perpendicularly oriented with respect to a flow direction of air and includes a first heat radiating region A110 and a first air flow region A120 provided with a plurality of first perforated holes disposed at predetermined locations; a heat radiating part 200 that is formed in the first heat radiating region A110 of the first support part 100 to discharge heat; a second support part 300 that includes a second heat radiating region A310 corresponding to the first heat radiating region A110 of the first support part 100 and a second air flow region 5320 provided with a plurality of second perforated holes disposed at predetermined locations adjacent to the second heat radiating region A310, the second air flow region 5320 corresponding to the first air flow region A120 of the first support part 100; a first fixation part 501 that is formed on the first support part 100 to fix one side of the heat radiating part 200; a second fixation part 502 that is formed on the second support part 300 to support and fix another side of the heat radiating part 200; and a housing 400 that supports and fixes the first support part 100, the second support part 300, and one end of the heat radiating part 200.

The heat radiating part 200 may include a heat radiating tube 221 that includes a positive temperature coefficient (PTC) element.

The first fixation part 501 and the second fixation part 502 may be a pair of protruding guides 510 that supports both ends of the heat radiating tube 221 on both sides of the first support part 100 and protrude to have a separation distance therebetween to be narrowed as the pair of guides extends outwardly, and a predetermined region of the heat radiating tube 221 may have a shape corresponding to a region between the protruding guides 510.

The first fixation part 501 and the second fixation part 502 may be formed in plural to be spaced apart from each other at a predetermined distance in a width direction.

The heater for vehicles may further include: a first protruding part 212 protruding from the heat radiating tube toward the first support part and penetrating the first support part, and a second protruding part protruding from the heat radiating tube toward the second support part and penetrating the second support part, wherein the first fixation part 501 and the second fixation part 502 are a fixed groove 520 into which the first and second protruding parts 212 of the heat radiating tube 221 is inserted respectively.

The heat radiating tube 221 may be fixed to the first support part 100 and the second support part 300 by caulking or folding a portion of each of the first and second protruding part, the portion protruding from the first and second support parts respectively by penetrating through the fixed groove 520 of each of the first and second support parts.

The heater for vehicles may further include: a first protruding part 212 protruding from the heat radiating tube toward the first support part and penetrating the first support part, and a second protruding part protruding from the heat radiating tube toward the second support part and penetrating the second support part, wherein the first fixation part 501 is at least one of the plurality of first perforated holes of the first support part 100, the second fixation part 502 is at least one of the plurality of second perforated holes of the second support part 300, and the first and second protruding parts of the heat radiating tube 221 are respectively fixed to the first support part 100 and the second support part 300 by caulking or folding a portion of each of the first and second protruding parts, the porting protruding from the first and second support part respectively by penetrating through the at least one of the plurality of first and second perforated holes respectively.

The heat radiating tube 221 may be provided with a first extension 211 and a second extension, wherein both sides of each of the first and second extensions extend in a height direction, and wherein one side of each of the first and second extensions is in contact with the first heat radiating region A110 and the second heat radiating region A310 respectively in the height direction and each of the first and second extensions 211 may be provided with each of the first and second protruding parts respectively.

The heat radiating part 200 may include: a heat radiating tube 221; a guide plate 222 that is disposed in the heat radiating tube 221 and is provided with a plurality of through holes in a width direction, wherein the PTC element 223 is disposed in a through hole of the plurality of through holes of the guide plate 222; and an anode plate 224 and a cathode plate 225 that are disposed at both sides of the guide plate 222 in the heat radiating tube 221, respectively.

The first support part 100, the second support part 300, and the heat radiating tube 221 may be fixed in the state in which one side or both sides of the first heat radiating region A110 of the first support part 100, the second heat radiating region A310 of the second support part 300, and one side or both sides of the heat radiating tube 221 are applied with a heat conductive layer 600.

The heater for vehicles may further include a first louver fin 102 that is extendedly formed at an edge of one of the plurality of first perforated holes and a second louver fin 302 that is extendedly formed at an edge of one of the plurality of second perforated holes.

The plurality of first perforated holes and the plurality of second perforated holes are disposed to make a predetermined region thereof overlap each other in the flow direction of air.

DETAILED DESCRIPTION OF MAIN ELEMENTS

Figure 1:
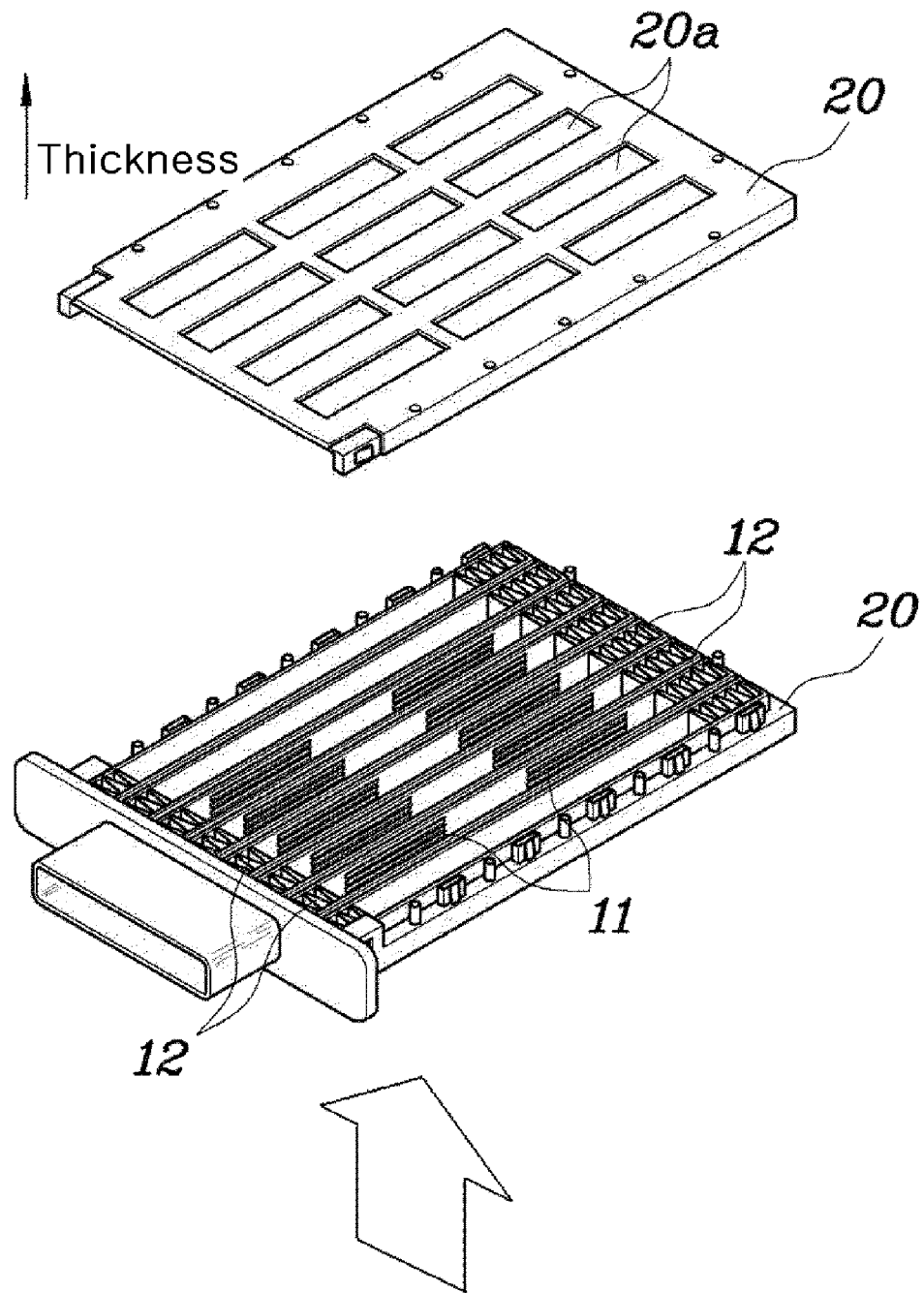
FIG. 1 is a diagram illustrating a PTC heater according to the related art.

1000: Heater for vehicles
100: First support part
101: First hollow part
102: First louver fin
A110: First heat radiating region
A120: First air flow region
200: Heat radiating part
211: Extension
212: Protrusion (protruding part)
221: Heat radiating tube
222: Guide plate
223: PTC element
224: Anode plate
225: Cathode plate
300: Second support part
301: Second hollow part
302: Second louver fin
A310: Second heat radiating region
A320: Second air flow region
400: Housing
501: First fixation part
502: Second fixation part
510: Protruding guide
D1, D2: Separation distance between protruding guides
520: Fixed groove
600: Heat conductive layer

DETAILED DESCRIPTION OF EMBODIMENTS

Hereinafter, a heater 1000 for vehicles having the above-mentioned characteristics will be described in detail with reference to the accompanying drawings.

The heater 1000 for vehicles according to the exemplary embodiment of the present invention is a device that is heat-exchanged with a flowing fluid (air) to perform heating and is configured to include a first support part 100, a heat radiating part 200, and a housing 400.

The first support part 100 has a plate shape perpendicularly oriented with respect to the flow direction of air and is configured to include a first heat radiating region A110 and a first air flow region A120.

Figure 2:
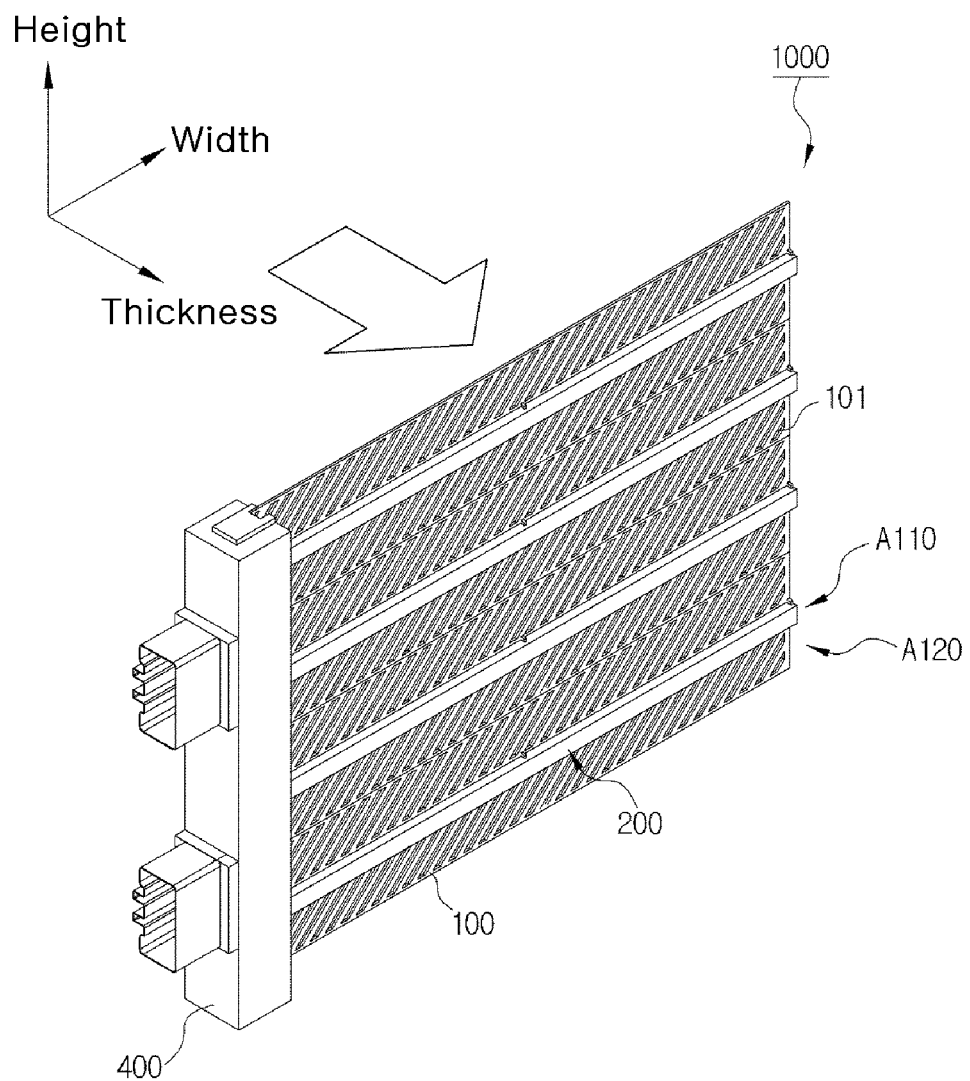
FIGS. 2 to 5 are a perspective view, an exploded perspective view, a cross-sectional view, and an exploded cross-sectional view of a heater for vehicles according to an exemplary embodiment of the present invention, respectively.

In the exemplary embodiment of the present invention, the flow direction of air is illustrated in FIG. 2, which is defined as the same meaning as a thickness direction.

That is, a predetermined region of the first support part 100 is provided with the first heat radiating region A110 which is a region in which the heat radiating part 200 is formed and the rest region thereof is provided with a first air flow region A120 in which air flows.

The first air flow region A120 is a region provided with a plurality of first hollow parts 101. Each of the plurality of first hollow parts 101 may have first perforated holes disposed at predetermined locations and adjacent to the first heat radiating region A110, and the shape of the first support part 100 may be variously formed, including the shape and number of first hollow parts 101, which will again be described below.

The heat radiating part 200 is configured to radiate heat and is formed in the first heat radiating region A100 of the first support part 100 to perform heating of the heater 1000 for vehicles according to the exemplary embodiment of the present invention.

The heater 1000 for vehicles according to the exemplary embodiment of the present invention may use the simple plate-shaped first support part 100 to have a simpler configuration than that of a fin shaped support part according to the related art and may reduce the entire thickness to implement miniaturization by forming a heat radiating part 200 in the first heat radiating region A110.

The heat radiating part 200 may be variously formed, in particular, a heat radiating tube 221 including a positive temperature coefficient (PTC) element that has high heat radiating performance and is easily manufactured may be used.

Figure 6:
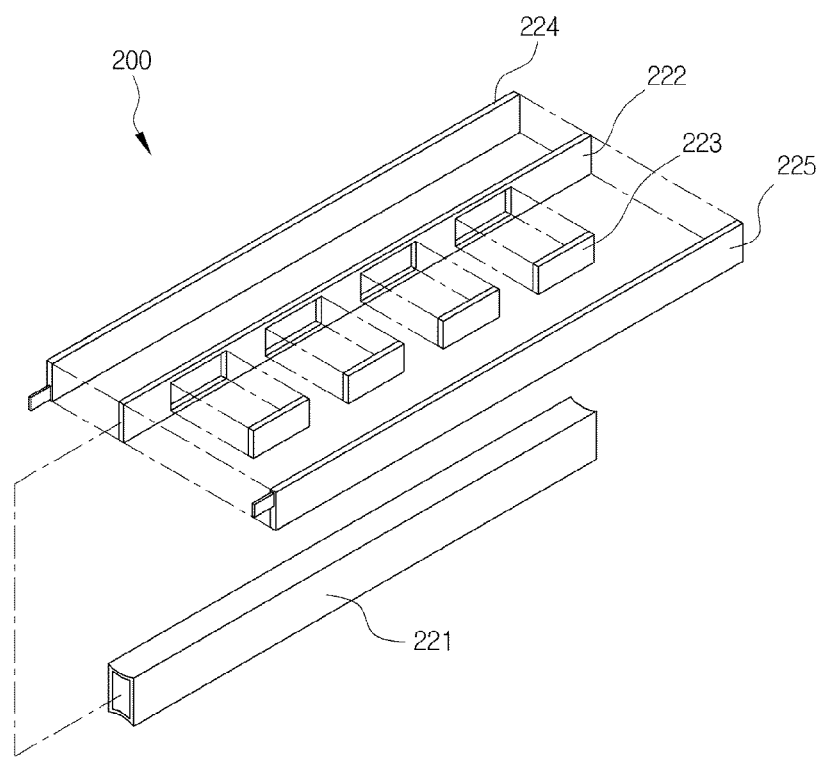
FIG. 6 is an exploded perspective view of an example of a heat radiating part of the heater for vehicles according to the exemplary embodiment of the present invention.

Describing the case in which the heat radiating part 200 is the heat radiating tube 221 using a PTC element 223 with reference to FIG. 6, the heat radiating unit 200 is configured to include the heat radiating tube 221, a guide plate 222 that is disposed in the heat radiating tube 221 and provided with a plurality of through holes in a width direction, the PTC element 223 disposed in the through hole of the guide plate 222, and an anode plate 224 and a cathode plate 225 each disposed at both sides of the guide plate 222 in the heat radiating tube 221.

In this case, the fixing of the first support part 100 and the heat radiating part 200 may be performed by further forming a first fixation part 501 for fixing one side of the heat radiating part 200 to the first support part 100.

The shape of the first fixation part 501 may be variously formed and a method of easily fixing the heat radiating part 200 by a simple insertion and fastening without using a separate binding material will be described below.

In the shape illustrated in FIGS. 2 to 5, the first fixation part 501 is a pair of protruding guides that supports both ends of the heat radiating tube 221 to one side of the first support part 100 and protrudes to have the separation distance therebetween to be narrowed as the guides extend outwardly, and a predetermined region of the heat radiating tube 221 may be a shape corresponding to a region between the protruding guides 510.

That is, the first fixation part 501, which is the protruding guide 510 that protrudes in a height direction illustrated in the drawings to support both ends of the heat radiating tube 221, has a hook shape having the separation distance between the protruding guides 510 to be narrowed as they extend outwardly. (D1>D2).

Figure 4:
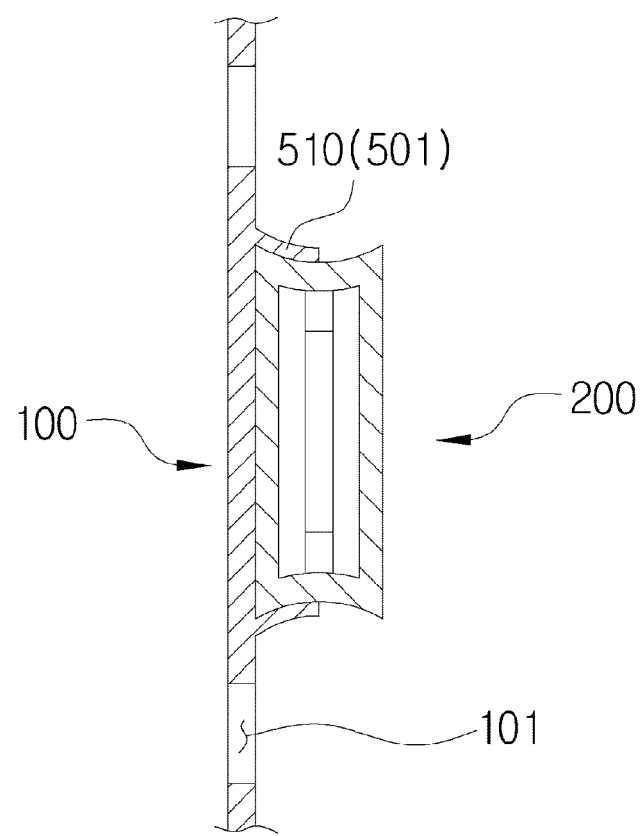
Figure 5:
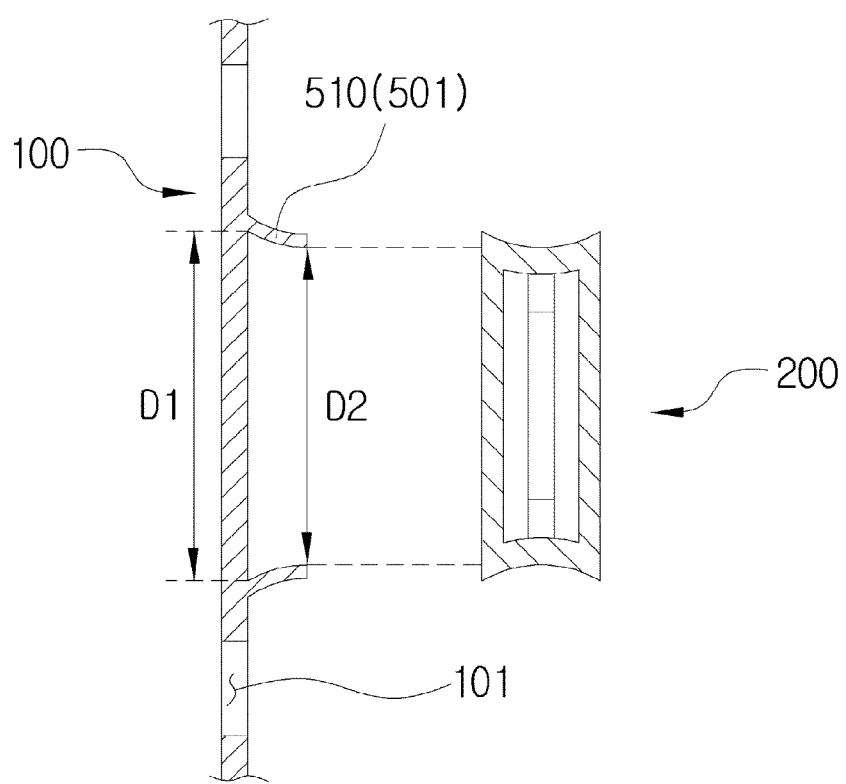

In this case, both ends of the heat radiating tube 221 have a shape to be inserted into a region between the protruding guides 510 and then not to be separated from the region, such that the region supported by the first fixation part 501 among regions of both ends of the heat radiating tube 221 may be formed to have a width widened in a side direction contacting the protruding guide 510 (see FIGS. 4 and 5).

In this case, the first fixation part 501 having the protruding guide 510 may be formed in plural in a direction illustrated as a width direction in the drawings.

FIG. 2 illustrates an example in which the protruding guide 510 is formed to support both sides of the heat radiating tube 221 at three places in a width direction, but the exemplary embodiment of the present invention is not limited thereto, and therefore the length and number of protruding guides 510 may be adjusted within a range in which the fixing of the heat radiating part 200 may be performed.

Figure 3:
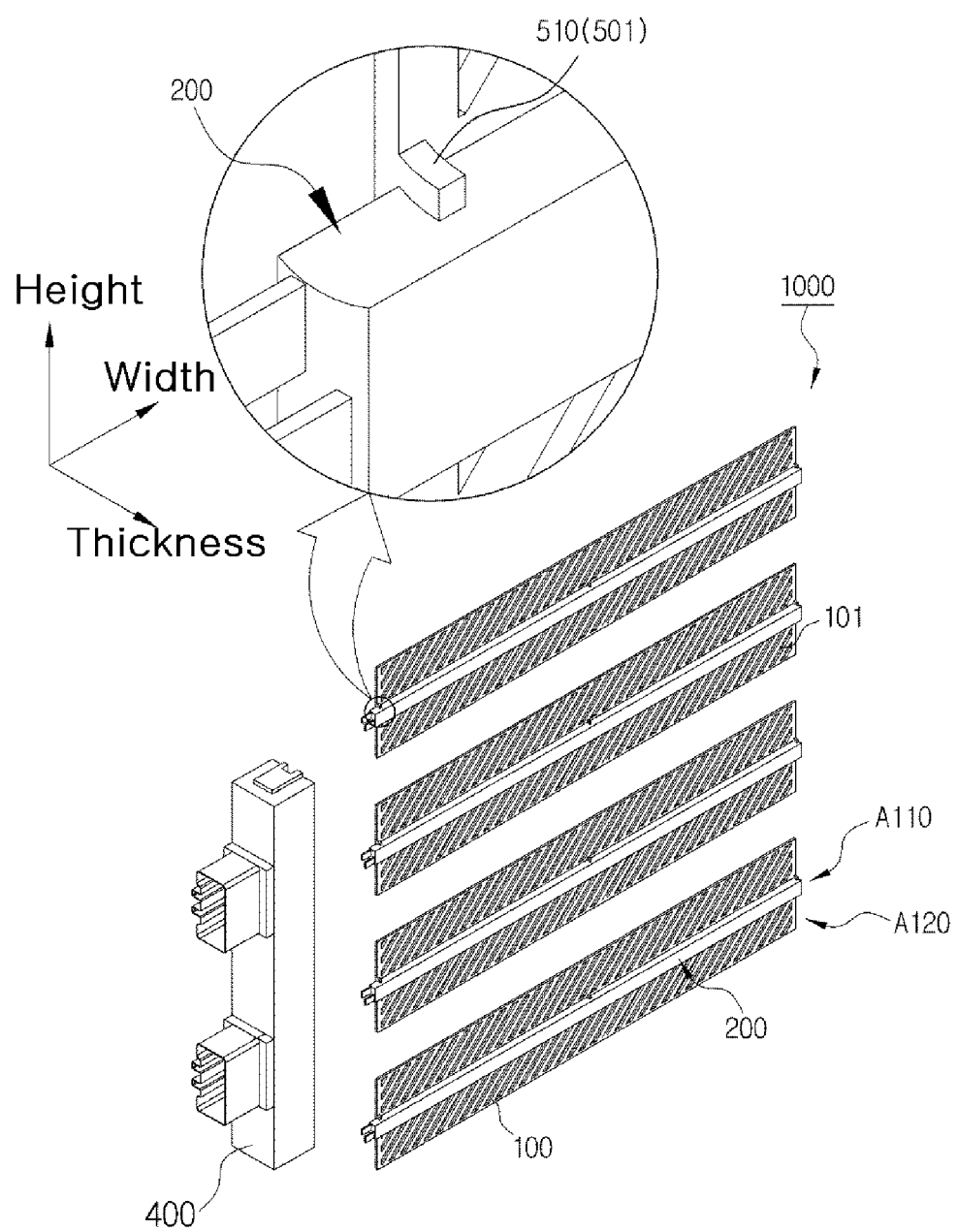

The heater 1000 for vehicles according to the exemplary embodiment of the present invention as illustrated in FIGS. 2 and 3 illustrates an example in which one first support part 100 is provided with one first heat radiating region A110 and is provided with the first air flow regions A120 disposed at both sides of the first heat radiating region A110, the first air flow region being provided with the plurality of first hollow parts 101 and the first support part 100 provided with the heat radiating part 200 formed in four in a height direction.

The exemplary embodiment of the present invention is not limited thereto and the first support part 100 may be provided with at least one first heat radiating region A110 and may be more variously formed, including the portion of the first air flow region A120 and the shape of the first hollow part 101.

In addition, in the heater 1000 for vehicles according to the exemplary embodiment of the present invention, the first support part 100 may be formed in one and the first heat radiating region A110 and the first air flow region A120 may also be formed in plural.

Figure 7:
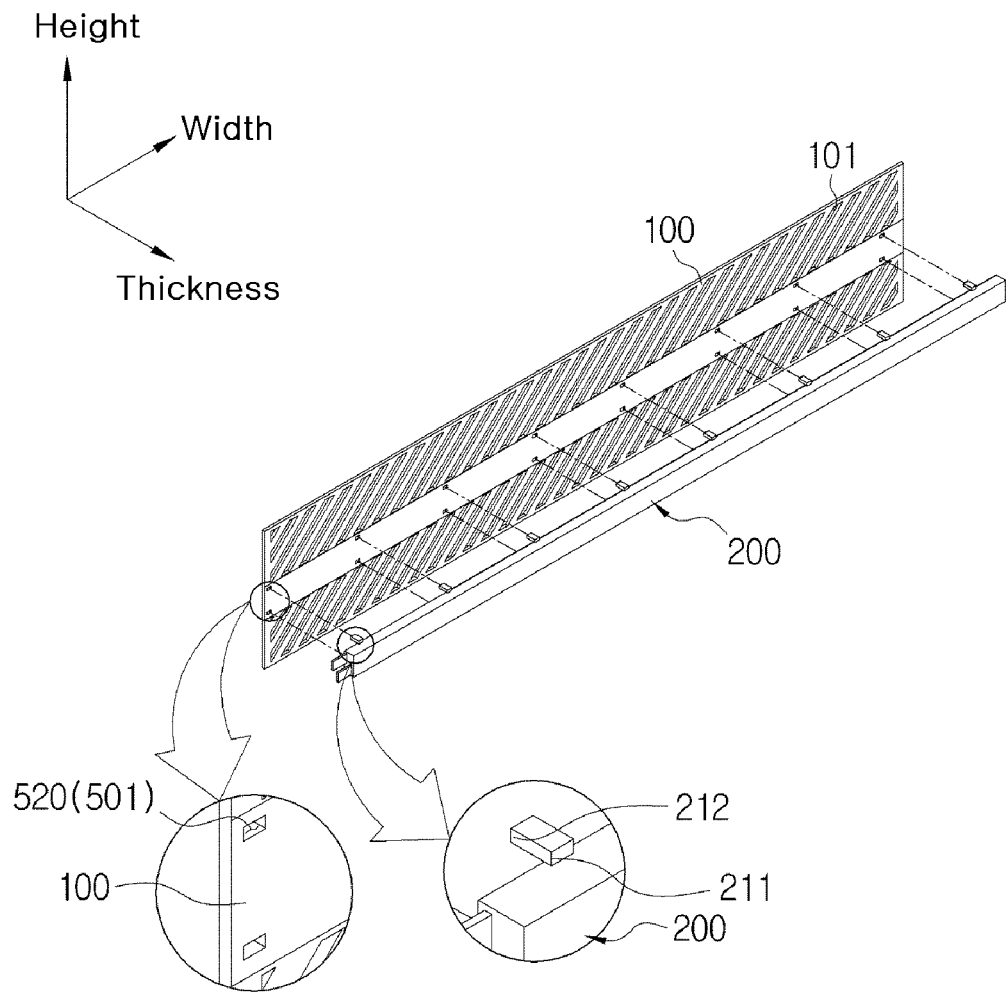
FIGS. 7 and 8 are another exploded perspective view and cross-sectional view of the heater for vehicles according to the exemplary embodiment of the present invention.
Figure 8:
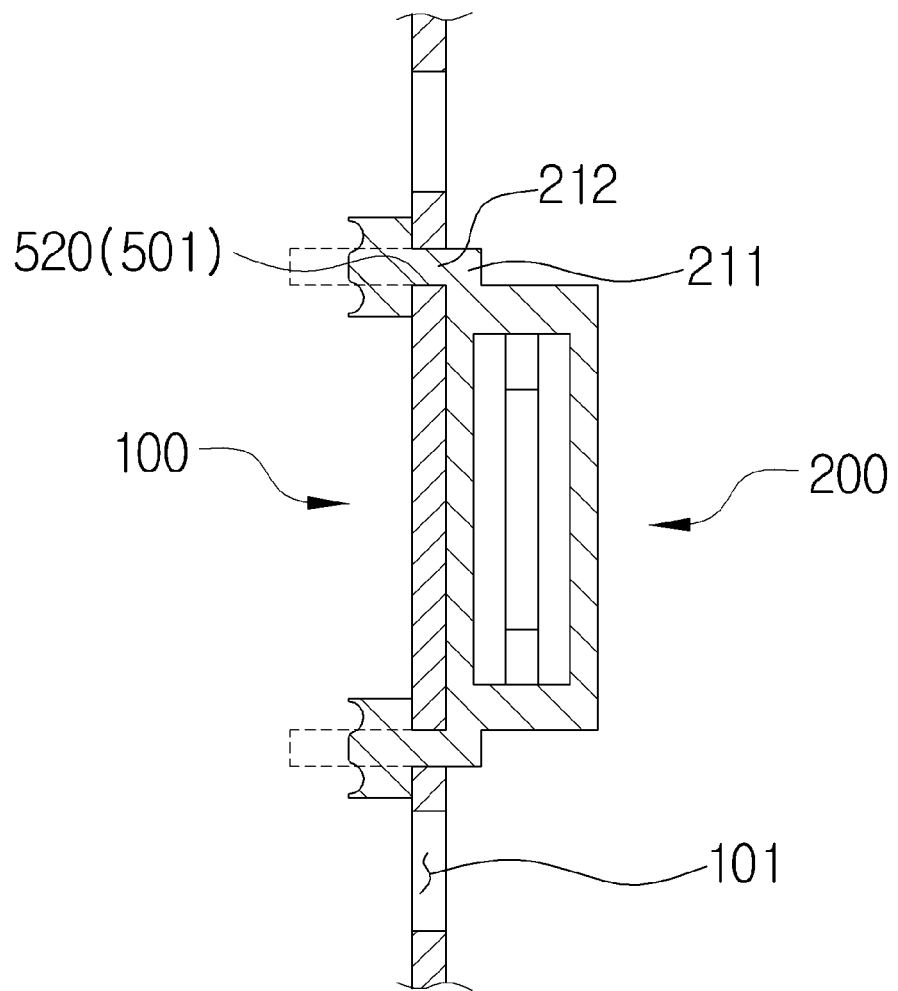
Figure 9:
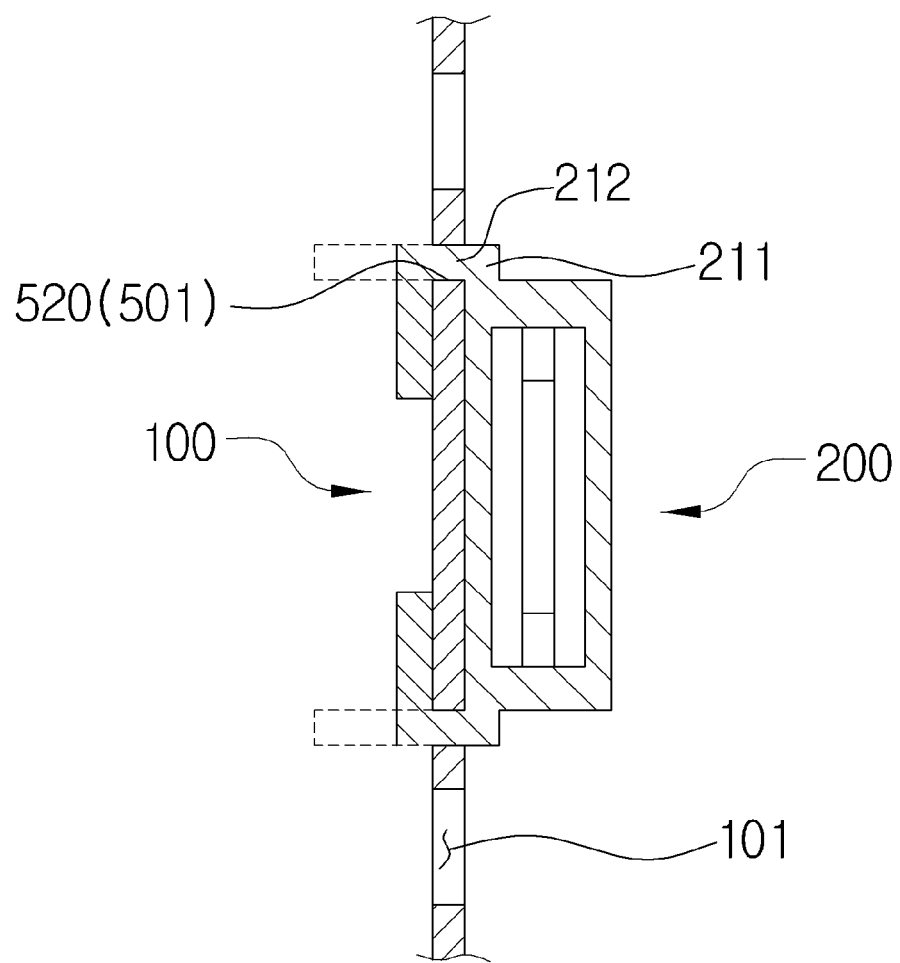
FIGS. 9 and 10 each are another cross-sectional views of the heater for vehicles according to the exemplary embodiment of the present invention.

In addition, in the heater 1000 for vehicles according to the exemplary embodiment of the present invention, the first fixation part 501 may have a shape illustrated in FIGS. 7 to 9.

The heater 1000 for vehicles according to the exemplary embodiment of the present invention illustrated in FIGS. 7 to 10 illustrates an example in which the heat radiating tube 221 is provided with a protrusion 212 of which the predetermined region protrudes outwardly and the heating tube 221 is fixed to the first support part 100 by using the protrusion 212.

In this case, FIGS. 7 to 9 illustrate an example in which the first fixation part 501 is a fixed groove 520 into which the protrusion 212 of the heat radiating tube 221 is inserted.

That is, the heat radiating tube 221 is provided with the protrusion 212, the first fixation part 501 is the fixed groove 520 into which the protrusion 212 is inserted, and the fixed groove 520 is inserted with the protrusion 212, such that a predetermined region of the end of protrusion 212 is extended to protrude from another side surface of the first support part 100 on which the heat radiating tube 221 of the first support part 100 is not disposed.

In this case, a region provided with the protrusion 212 in the heat radiating tube 221 is provided with an extension 211 of which both sides extend in a height direction of one side contacting with the first heat radiating region A110 so that the heat radiating tube 221 may sufficiently secure a surface contacting the first heat radiating region A110 and the extension 211 may be provided with the protrusion 212.

In more detail, FIG. 7 is an exploded perspective view illustrating the state in which the first support part 100 is spaced apart from the heat radiating tube 221 provided with the protrusion 212, the heater 100 for vehicles according to the exemplary embodiment of the present invention illustrated in FIG. 8 illustrates an example in which the protrusion 212 is formed in plural and the heat radiating tube 221 is inserted into the fixed groove 520 of the first support part 100 and then the protrusion 212 is fixed by a caulking and by penetrating through the fixed groove 520.

In the exemplary embodiment of the present invention, the caulking means the fixing of the protrusion 212 by forging and compressing the protruding region (i.e., portion) of the protrusion 212.

In addition, the heater 100 for vehicles according to the exemplary embodiment of the present invention illustrated in FIG. 9 illustrates an example in which the protrusion 212 penetrates through the first support part 100 through the fixed groove 520 and an end of the protrusion 212 is folded to fix the heat radiating tube 221 to the first support part 100.

In cross-sectional views of FIGS. 8 and 9, the state in which the protrusion 212 is inserted into the fixed groove 520 is represented by a dotted line, and the state in which the protruding region of the protrusion 212 is subjected to the caulking operation or the folding operation, under the state in which the protrusion 212 is inserted into the fixed groove 520, is represented by a solid line.

The number of protrusions 212 may be variously formed and in the heater 1000 for vehicles according to the exemplary embodiment of the present invention, the end of the protrusion 212 is subjected to the caulking operation or the folding operation so that the heat radiating tube 221 may be fixed to the first heat radiating region A110 of the first support part 100.

Figure 10:
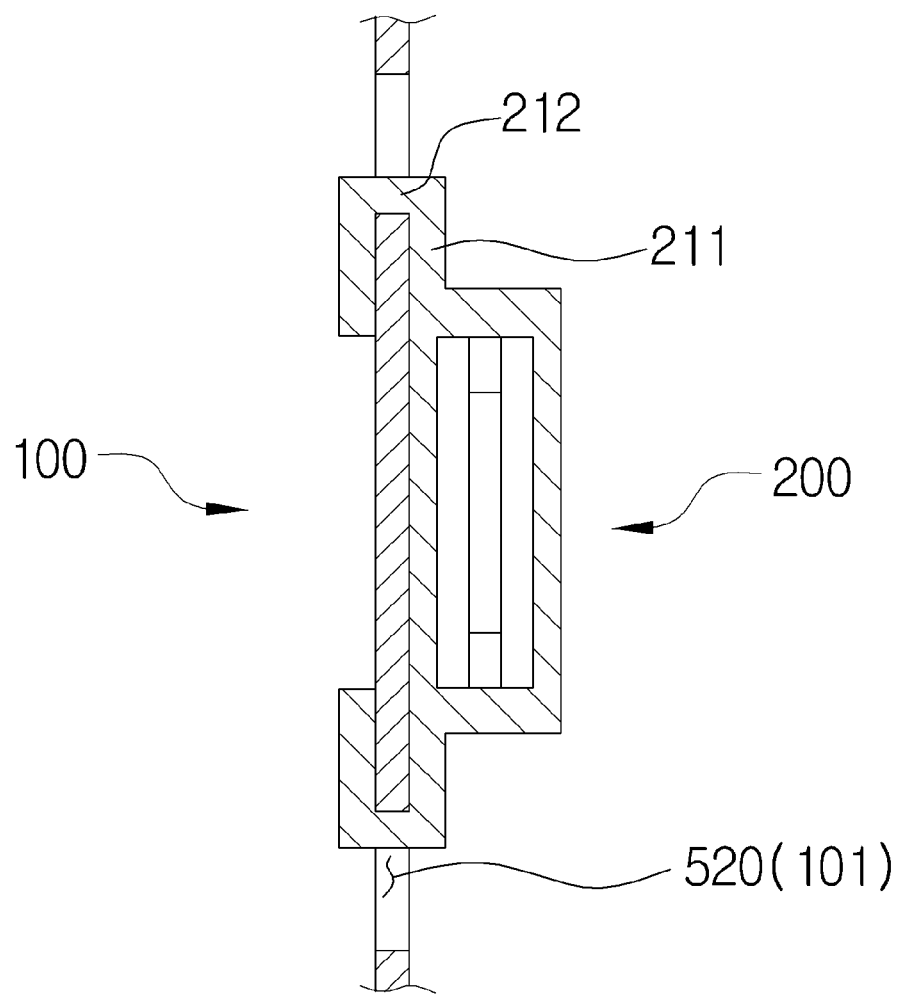
Figure 11:
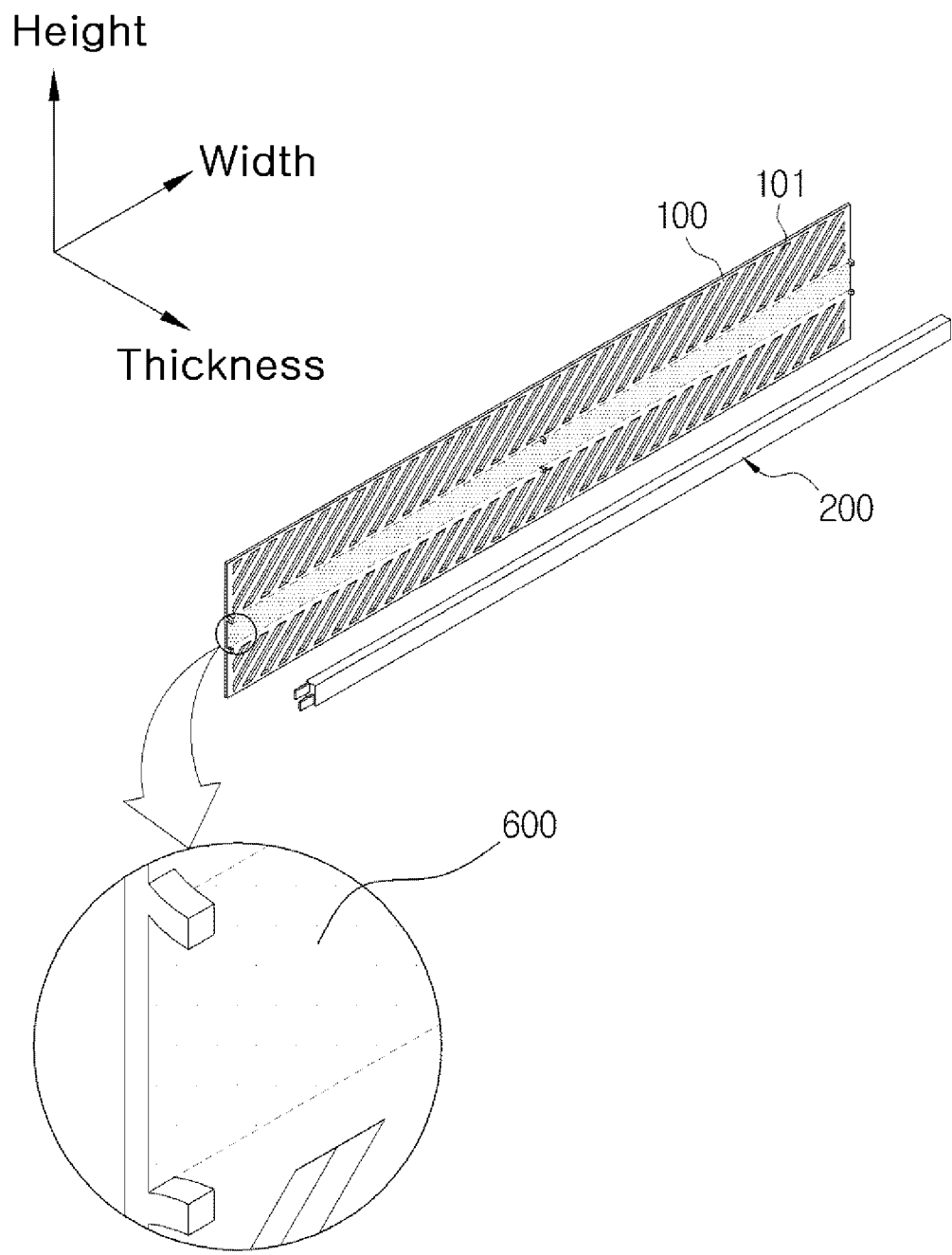
FIGS. 11 and 12 are another exploded perspective view and cross-sectional view of the heater for vehicles according to the exemplary embodiment of the present invention.
Figure 12:
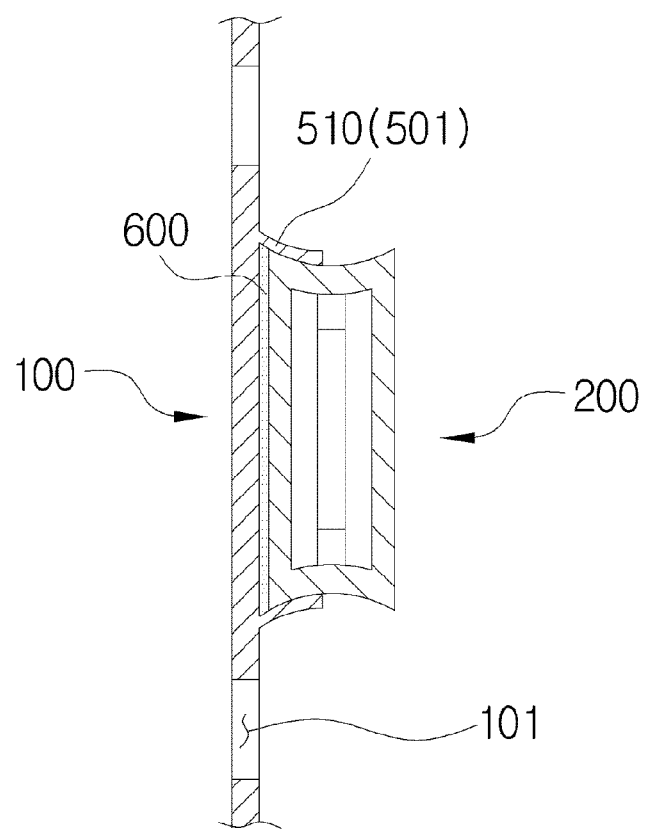

Further, FIG. 10 is another cross-sectional view illustrating the heater 1000 for vehicles according to the exemplary embodiment of the present invention and illustrates an example in which the first fixation part is the first hollow part 101 of the first support part 100 and the protrusion 212 of the heat radiating tube 221 is fixed to the first support part 100 by folding a region (i.e., an end portion of the protrusion 212) protruding by penetrating through the first hollow part 101.

Further, although not illustrated in the drawings, in the heater 1000 for vehicles according to the exemplary embodiment of the present invention, the protruding region of the heat radiating tube 221 by penetrating through the first hollow part 101 of the protruding part 212 may also be fixed to the heat radiating tube 221 by the caulking.

The shape illustrated in FIG. 10 illustrates an example in which the heat radiating tube 221 is provided with the extension 211 by extending both sides of one side contacting the first heat radiating region A110 and the extension 211 is provided with the protruding part 212 so that the protruding part 212 may be fixed through the first hollow part 101.

In addition, in the heater 1000 for vehicles according to the exemplary embodiment of the present invention, the first support 100 and the heat radiating tube 221 may be fixed to contact each other under the state in which one side or both sides of the first heat radiating region A110 and the heat radiating tube 221 of the first support part 100 are applied with the heat conductive layer 600.

This is to prevent the heat transfer rate from decreasing due to a gap formed on a contacting surface between the first support part 100 and the heat radiating part 200 by a mechanical fastening method, and the heat conductive layer 600 having high heat conductivity is formed on one side of the first heat radiating region A110 of the first support part 100 and the heat radiating tube 221 or both sides thereof, and then the heat radiating tube 221 may be fixed to the first heat radiating region A110 of the first support part 100.

For the heat conductive layer 600, a thermal grease may be used. In addition to this, various materials, having high conductivity to prevent a gap from being formed on the contacting surfaces of the first support part 100 and the heat radiating part 200, and also to easily transfer the heat of the heat radiating part 200 to the first support 100 side, may be used.

In addition, the heater 1000 for vehicles according to the exemplary embodiment of the present invention may include a second support part 300 that includes a second heat radiating region A310 corresponding to the first heat radiating region A110 of the first support part 100 and a second air flow region 5320 provided with a plurality of second hollow parts 301, each of which having a plurality of second perforated holes disposed adjacent to the second heat radiating region A310, in which the second air flow region 5320 corresponds to the first air flow region A120 of the first support part 100.

The second support part 300 is configured to support both surfaces of the heat radiating part 200 along with the first support part 100, and one side of the heat radiating part 200 is disposed to contact the first heat radiating region A110 of the first support part 100 and the other side of the heat radiating part 200 is disposed to contact the second heat radiating region A310 of the second support part 300.

In this case, the second support part 300 may be provided with the second fixation part 502 to fix the second support part 300 and the heat radiating part 200, like the fixing method of the first support part 100 and the heat radiating part 200 as described above.

The second fixation part 502 may be identically formed as the first fixation part 501. In more detail, the shape of the protruding guide 510 may be used for that of the second fixation part 502.

Further, the second fixation part 502 has a shape of a fixed groove 520, and the heat radiating tube 221 contacting the second support part 300 may be provided with the protruding part 212.

Figure 13:
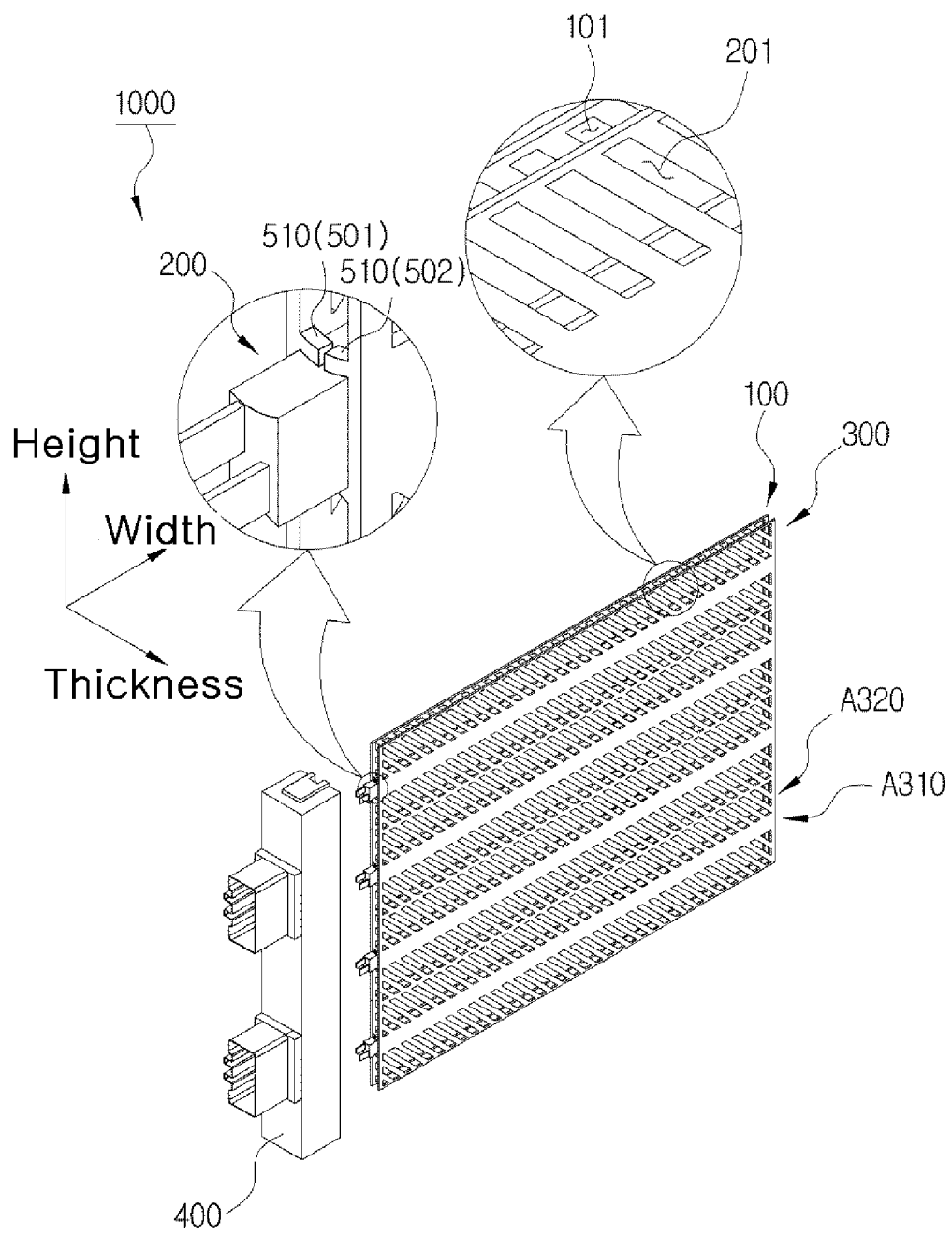
FIGS. 13 and 14 are another perspective view and cross-sectional view of the heater for vehicles according to the exemplary embodiment of the present invention.
Figure 14:
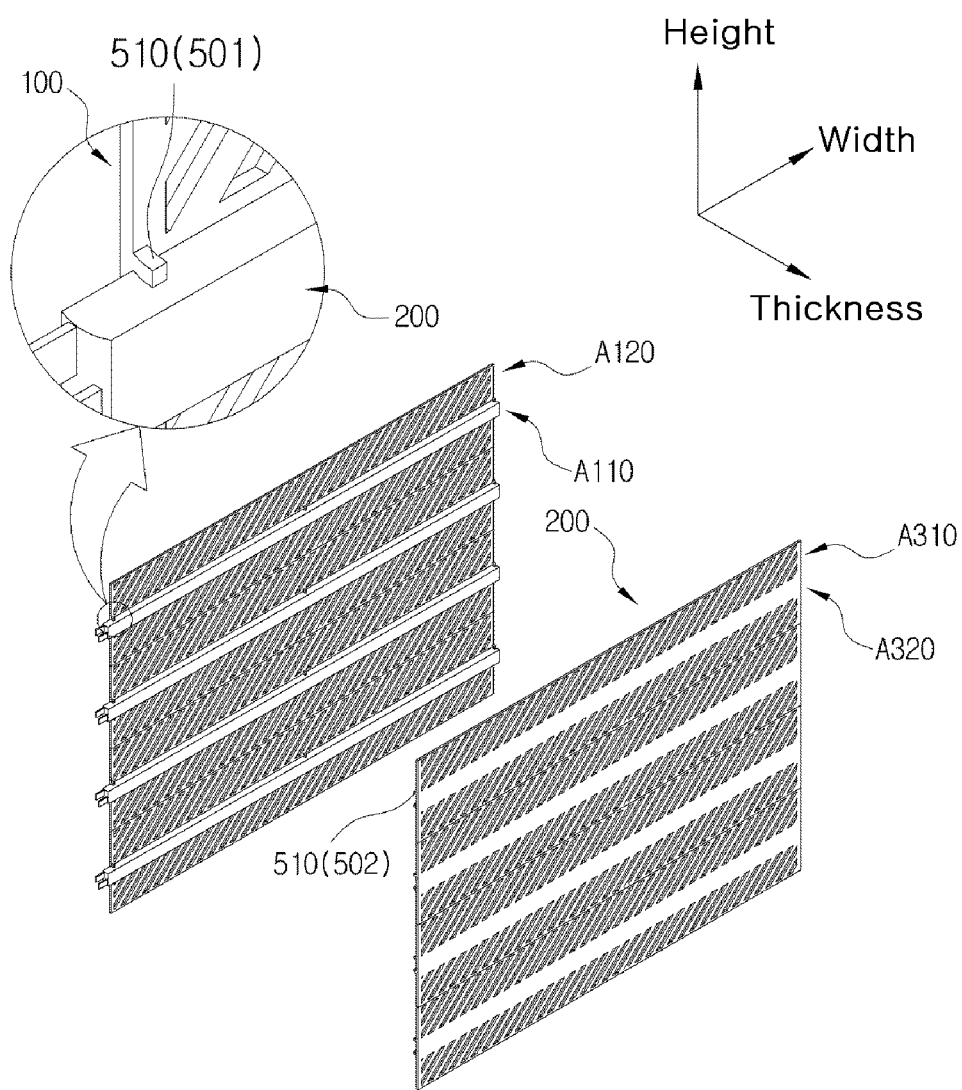
Figure 15:
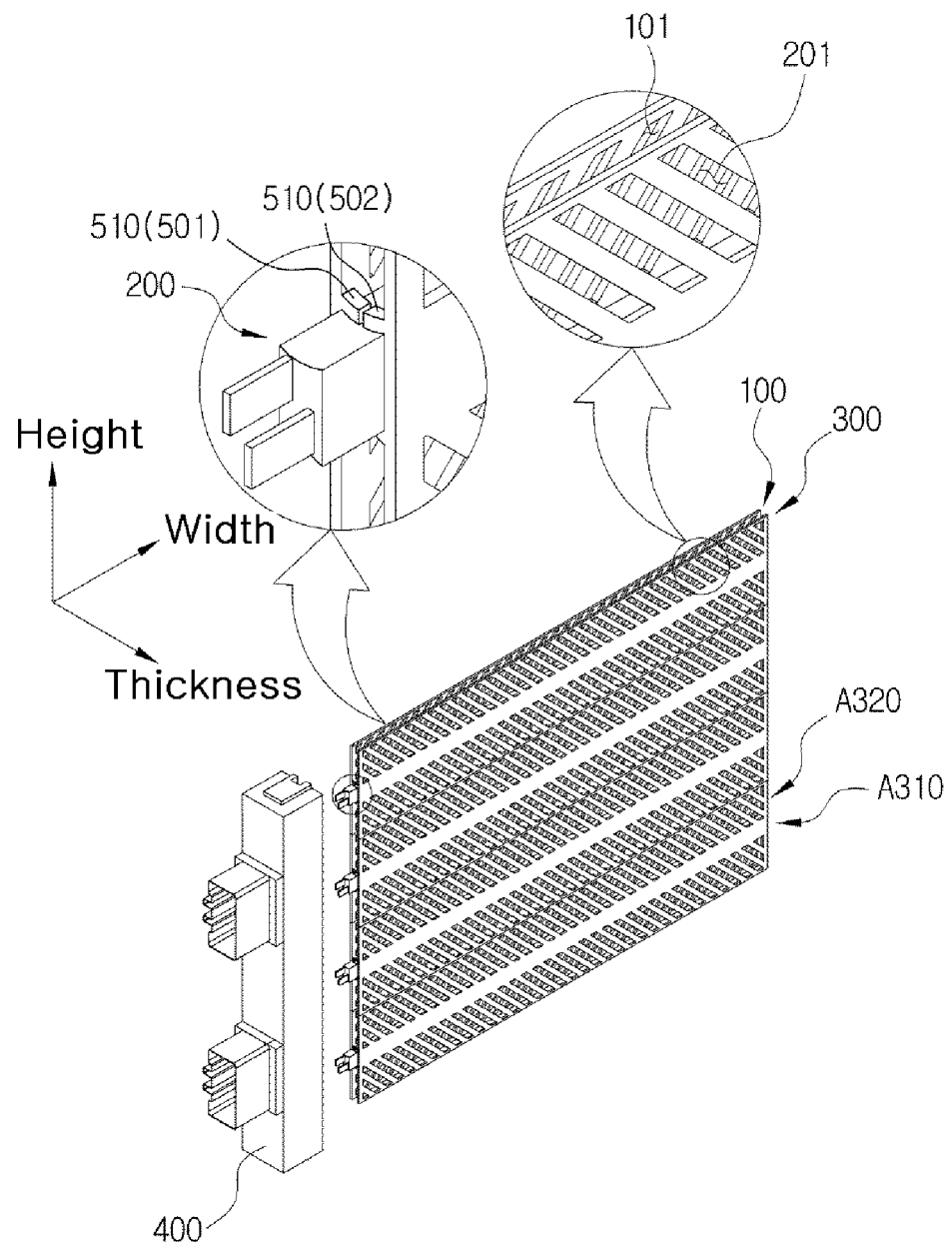
FIG. 15 is another perspective view of the heater for vehicles according to the exemplary embodiment of the present invention.

FIGS. 13 to 15 illustrate an example in which the first fixation part 501 of the first support part 100 and the second fixation part 502 of the second support part 300 have the shape of the protruding guide 510 and the number and positions of protruding guides 510 may be more variously formed in consideration of the first hollow part 101 formed on the first support part 100, the second hollow part 301 formed on the second support part 300, the shape of the heat radiating part 200, and the like.

In this case, the first fixation part 501 and the second fixation part 502 are formed in plural, being spaced apart from each other at a predetermined distance in a width direction, thereby further improving a supporting force with a small number of fixation parts.

Meanwhile, as illustrated in FIGS. 13 and 14, the entire shape of the second support part 300 may be formed identical to the first support part 100 and as illustrated in FIG. 15, the second hollow part 301 different from the shape of the first hollow part 101 of the first support part 100 may be formed so as to adjust the flow of air.

The shape illustrated in FIG. 15 illustrates an example in which the first hollow part 101 of the first support part 100 and the second hollow part 301 of the second support part 300 are formed to be inclined by a predetermined angle in a width direction, and the inclined angles thereof are different from each other, and an example in which the first hollow part 101 and the second hollow part 301 are formed so that only the predetermined region in a region the first hollow part 101 and the second hollow part 301 corresponds to (overlap) each other in a flow direction of air.

That is, in the shape illustrated in FIG. 15, a part of air passing through the first hollow part of the first support part 100 is directly discharged through the second hollow part 301 of the second support part 300 and the rest thereof may form a turbulence flow by colliding with a plate region of the second support part 300 and then is discharged.

The heater 1000 for vehicles according to the exemplary embodiment of the present invention as illustrated in FIG. 15 may create the turbulent flow air and further increase the heat exchange time between air and the heat radiating part 200, thereby further increasing the heat exchange performance.

Meanwhile, in the shape in which the heater 1000 for vehicles further includes the second support part 300, the second support part 300 may be integrally formed, like the case in which the whole first support part 100 is integrally formed.

Further, when the first support part 100 has a module form, the second support part 300 is also formed at a size corresponding to the first support part 100, such that both of the first support part 100 and the second support part 300 may be formed in a module.

Figure 16:
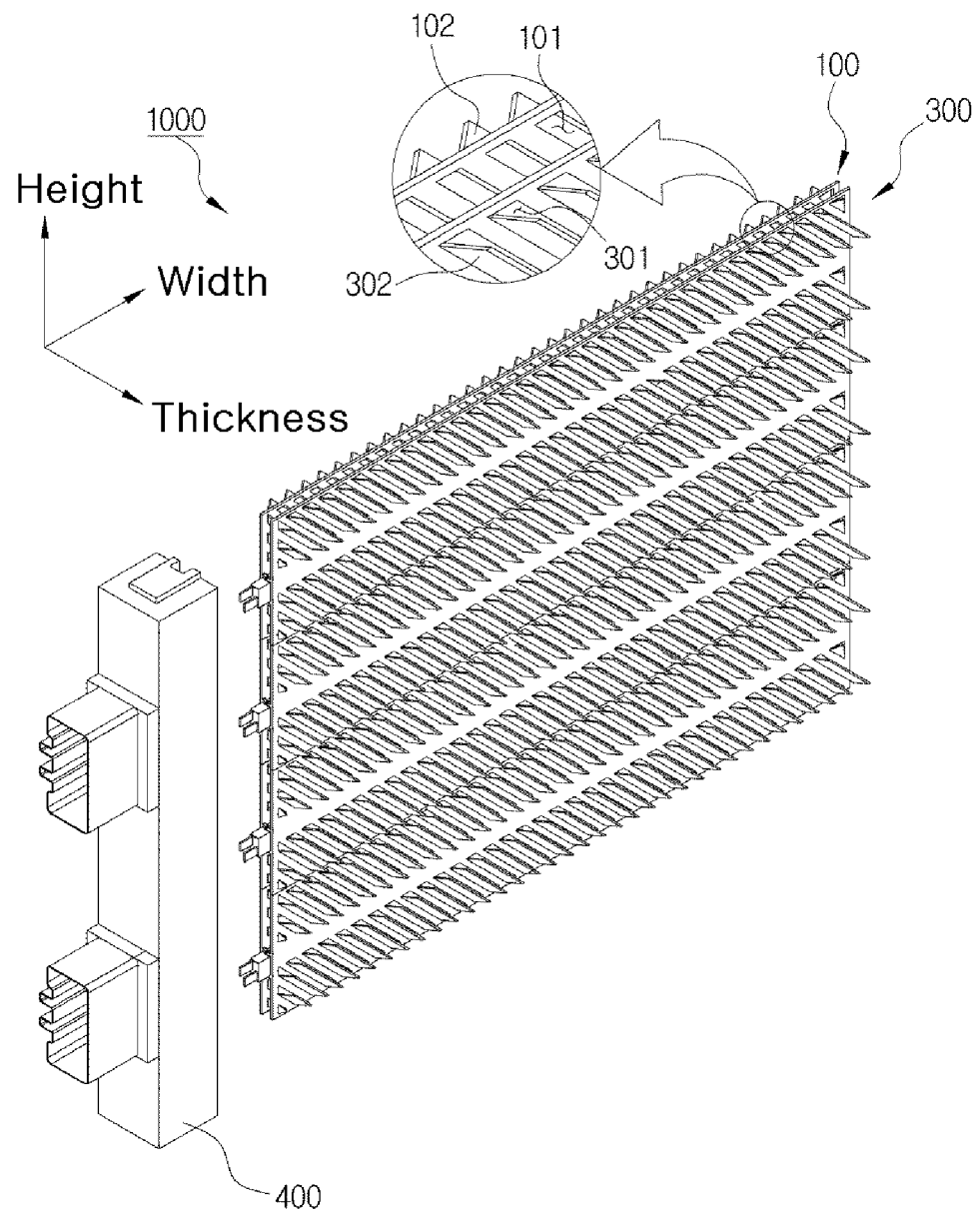
FIG. 16 is another perspective view of the heater for vehicles according to the exemplary embodiment of the present invention.

Further, in the heater 1000 for vehicles according to the exemplary embodiment of the present invention, in order to further increase the heat exchange performance, the first hollow part 101 may be provided with the first louver fin 102 and the second hollow part 301 of the second support part 300 may be further provided with a second louver fin 302, which is illustrated in FIG. 16.

The first louver fin 102 and the second louver fin 302 protrude by cutting a predetermined region corresponding to the first hollow part 101 and the second hollow part 301, respectively, and bending the cut region.

That is, the first louver fin 102 and the second louver fin 302 are configured to be integrally formed with the first support part 100 and the second support part 300 and have a form extending from the first hollow part 101 and the second hollow part 301.

The formation of the first louver fin 102 and the second louver fin 302 may be simply formed by adding only the process of cutting only the rest portion other than the specific portion and bending the specific portion connected to the first support part 100 and the second support part 300, in the process of forming the first hollow part 101 and the second hollow part 301.

In other words, the heater 1000 for vehicles according to the exemplary embodiment of the present invention may be manufactured by a simple method and may further increase the contact area with air, by forming the first louver fin 102 and the second louver fin 302 using the region to form the first hollow part 101 and the second hollow part 301, thereby improving the overall heat exchange performance.

Therefore, the heater 1000 for vehicles according to the exemplary embodiment of the present invention may be easily manufactured and have the reduced thickness to implement the miniaturization and increase the heat exchange performance to improve the heating performance, by using the plate-shaped first support part 100 (and second support part 300) perpendicularly oriented with respect to the flow direction of air and easily fixing the heat radiating part using the first fixation part 501 (and second fixation part 502).

Therefore, the heater for vehicles according to the exemplary embodiment of the present invention can be easily manufactured and have a reduced thickness to implement the miniaturization, by forming the heat radiating part using the plate-shaped first support part (and second support part) perpendicularly oriented with respect to the flow direction of air and can fix the support part and the heat radiating part by the simple method to increase the manufacturability.

In particular, according to the heater for vehicles according to the exemplary embodiment of the present invention, the first fixation part (and second fixation part) can be formed as a pair of protruding guides protruding to have a separation distance therebetween to be narrowed as the guides extend outwardly, or the first fixation part (and second fixation part) can be a fixed groove and a heat radiating tube can be provided with the protrusion to fasten the support part and the heat radiating part by the simple fastening process.

Further, according to the heater for vehicles of the exemplary embodiment of the present invention, the heat transfer can be made even in the side region of the heat radiating part through the first fixation part (and second fixation part) and the first heat radiating region of the first support part (second heat radiating region of second support part) and one side or both sides of the heat radiating tube can be provided with the heat conductive layer to more increase the air heating efficiency.

In addition, the heater for vehicles according to the exemplary embodiment of the present invention can have the simple configuration and more increase the manufacturability by integrally forming the first support part (and second support part) in a height direction or can be easily changed in design by controlling the number of modules in response to the change in the height direction when the first support part and the heat radiating part (and second support part) have a module form.

Further, the heater for vehicles according to the exemplary embodiment of the present invention can be simply manufactured by bonding the heat radiating tube including a guide plate, a PTC element, an anode plate, and a cathode plate to the first heat radiating region of the first support part when the heat radiating tube including the PTC element is used as the heat radiating part and can radiate heat through the first support part to prevent the problem that may occur due to the overheating.

Further, the heater for vehicles according to the exemplary embodiment of the present invention can further include the second support part to more secure the heat radiating region, and may support both sides of the heat radiating part along with the first support part to increase the structural safety.

In this case, according to the heater for vehicles of the exemplary embodiment of the present invention, the first hollow part disposed on the first support part and the second hollow part disposed on the second support part can be formed to overlap each other in the flow direction of air in the predetermined region to create a turbulent air flow, thereby improving the heat exchange performance of air.

Further, the heater for vehicles according to the exemplary embodiment of the present invention can more increase the heat exchange area and can further include the first louver fin and the second louver fin that can guide air, thereby maximizing the heat exchange performance.

The present invention is not limited to the above-mentioned exemplary embodiments, and may be variously applied, and may be variously modified without departing from the gist of the present invention claimed in the claims.

What is claimed is:

1. A heater for vehicles, comprising:
    a first support part including a plate substantially perpendicularly oriented with respect to a flow direction of air, a first heat radiating region, and a first air flow region having a plurality of perforated holes disposed at predetermined locations;
    a heat radiating part fixed to the first heat radiating region of the first support part to discharge heat and including a heat radiating tube that includes a positive temperature coefficient (PTC) element; and
    a housing that supports and fixes the first support part and an end of the heat radiating part,
    wherein the first support part further includes a first fixation part for fixing one side of the heat radiating part.

2. The heater for vehicles of claim 1, wherein the first fixation part is a pair of protruding guides that supports both ends of the heat radiating tube on one side of the first support part and protrudes to have a separation distance therebetween to be narrowed as the pair of guides extends outwardly, and
    a predetermined region of the heat radiating tube has a shape corresponding to a region between the protruding guides.

3. The heater for vehicles of claim 1,
    wherein the heat radiating tube includes a protruding part protruding outwardly from the heat radiating tube and penetrating through the first support part, and
    wherein the first fixation part is a fixed groove into which the protruding part of the heat radiating tube is inserted.

4. The heater for vehicles of claim 3, wherein the heat radiating tube is fixed to the first support part by caulking or folding a portion of the protruding part, the portion protruding from the first support part by penetrating through the fixed groove.

5. The heater for vehicles of claim 1,
    wherein the heat radiating tube includes a protruding part protruding outwardly from the heat radiating tube and penetrating through the first support part, and
    wherein the first fixation part is at least one of the perforated holes of the first support part and the protruding part of the heat radiating tube is fixed to the first support part by caulking or folding a portion of the protruding part, the portion protruding from the first support part by penetrating through the at least one of the perforated holes.

6. The heater for vehicles of claim 5, wherein the heat radiating tube includes an extension, wherein both sides of the extension extend in a height direction, and wherein one side of the extension is in contact with the first heat radiating region and the extension is connected with the protruding part.

7. The heater for vehicles of claim 1, wherein the heat radiating part includes:
    a heat radiating tube;
    a guide plate disposed in the heat radiating tube and including a plurality of through holes disposed in a width direction, wherein the PTC element is disposed in a through hole of the plurality of through holes of the guide plate; and
    an anode plate and a cathode plate disposed at both sides of the guide plate in the heat radiating tube, respectively.

8. The heater for vehicles of claim 1, wherein the first support part and the heat radiating tube are fixed to each other in a state in which one side or both sides of the first heat radiating region and the heat radiating tube of the first support part are applied with a heat conductive layer.

9. The heater for vehicles of claim 1, further comprising:
    a first louver fin that is extendedly disposed at an edge of one of the plurality of perforated holes.

10. A heater for vehicles, comprising:
    a first support part including a plate substantially perpendicularly oriented with respect to a flow direction of air, a first heat radiating region, and a first air flow region having a plurality of first perforated holes disposed at predetermined locations;

a heat radiating part fixed to the first heat radiating region of the first support part to discharge heat and including a heat radiating tube that includes a positive temperature coefficient (PTC) element;

a second support part that includes a second heat radiating region corresponding to the first heat radiating region of the first support part and a second air flow region including a plurality of second perforated holes disposed at predetermined locations adjacent to the second heat radiating region, the second air flow region corresponding to the first air flow region of the first support part;

a first fixation part that is located on the first support part to fix one side of the heat radiating part;

a second fixation part that is located on the second support part to fix another side of the heat radiating part; and a housing that supports and fixes the first support part, the second support part, and one end of the heat radiating part.

11. The heater for vehicles of claim 10, wherein the first fixation part and the second fixation part are a pair of protruding guides that supports both ends of the heat radiating tube on both sides of the first support part and protrudes to have a separation distance therebetween to be narrowed as the pair of guides extends outwardly, and a predetermined region of the heat radiating tube has a shape corresponding to a region between the protruding guides.

12. The heater for vehicles of claim 11, wherein the first fixation part and the second fixation part are disposed in plural to be spaced apart from each other at a predetermined distance in a width direction.

13. The heater for vehicles of claim 10, wherein the heat radiating tube includes a first protruding part protruding from the heat radiating tube toward the first support part and penetrating the first support part, and a second protruding part protruding from the heat radiating tube toward the second support part and penetrating the second support part, and wherein the first fixation part and the second fixation part are a fixed groove into which the first and second protruding parts of the heat radiating tube is inserted respectively.

14. The heater for vehicles of claim 13, wherein the heat radiating tube is fixed to the first support part and the second support part by caulking or folding a portion of each of the first and second protruding parts, the portion protruding from the first and second support parts respectively by penetrating through the fixed groove of each of the first and second support parts.

15. The heater for vehicles of claim 10, wherein the heat radiating tube includes a first protruding part protruding from the heat radiating tube toward the first support part and penetrating the first support part, and a second protruding part protruding from the heat radiating tube toward the second support part and penetrating the second support part, and wherein the first fixation part is at least one of the plurality of first perforated holes of the first support part, the second fixation part is at least one of the plurality of second perforated holes of the second support part, and the first and second protruding parts of the heat radiating tube are respectively fixed to the first support part and the second support part by caulking or folding a portion of each of the first and second protruding parts, the porting protruding from the first and second support part respectively by penetrating through the at least one of the plurality of first and second perforated holes respectively.

16. The heater for vehicles of claim 15, wherein the heat radiating tube includes a first extension and a second extension, wherein both sides of each of the first and second extensions extend in a height direction, and wherein one side of each of the first and second extensions is in contact with the first heat radiating region and the second heat radiating region respectively in the height direction and each of the first and second extensions is connected with each of the first and second protruding parts respectively.

17. The heater for vehicles of claim 10, wherein the heat radiating part includes:

a heat radiating tube;

a guide plate that is disposed in the heat radiating tube and including a plurality of through holes in a width direction, wherein the PTC element is disposed in a through hole of the plurality of through holes of the guide plate; and an anode plate and a cathode plate that are disposed at both sides of the guide plate in the heat radiating tube, respectively.

18. The heater for vehicles of claim 10, wherein the first support part, the second support part, and the heat radiating tube are fixed in the state in which one side or both sides of the first heat radiating region of the first support part, the second heat radiating region of the second support part, and one side or both sides of the heat radiating tube are applied with a heat conductive layer.

19. The heater for vehicles of claim 10, further comprising:

a first louver fin that is extendedly disposed at an edge of one of the plurality of first perforated holes and a second louver fin that is extendedly disposed at an edge of one of the plurality of second perforated holes.

20. The heater for vehicles of claim 10, wherein the plurality of first perforated holes and the plurality of second perforated holes are disposed to make a predetermined region thereof overlap each other in the flow direction of air.

* * * * *